United States Patent [19]

Thomas, Jr. et al.

[11] 4,019,414
[45] Apr. 26, 1977

[54] STRAND GRANULATION MACHINE
[75] Inventors: Dorsey O. Thomas, Jr., Chesterfield; Alvah B. Terry, St. Louis, both of Mo.
[73] Assignee: Monsanto Company, Decatur, Ala.
[22] Filed: Jan. 12, 1976
[21] Appl. No.: 648,606
[52] U.S. Cl. .............................. 83/356.3; 83/555; 83/694; 83/913
[51] Int. Cl.² ...................... D01G 1/04; B26D 5/08
[58] Field of Search ....... 83/913, 926 H, 42, 356.3, 83/554, 555, 592, 647, 678, 355, 694

[56]   References Cited
UNITED STATES PATENTS 2,381,240  8/1945  Wicker et al. .................. 83/913 X

*Primary Examiner*—Willie G. Abercrombie
*Attorney, Agent, or Firm*—Robert L. Broad, Jr.

[57] ABSTRACT

Strand granulation machines characterized by cutter bearing rotors and strand passages wherein continuous strands are passed through generally cross-sectionally circular shear bushings at the exit end of which that they are engaged and severed by the rotating cutters are improved by employing spring-loaded rotating cutters in working relationship with a cutter positioning cam to move the cutters reciprocally generally along the radius of the circle generated by their sweep of rotation.

1 Claim, 2 Drawing Figures

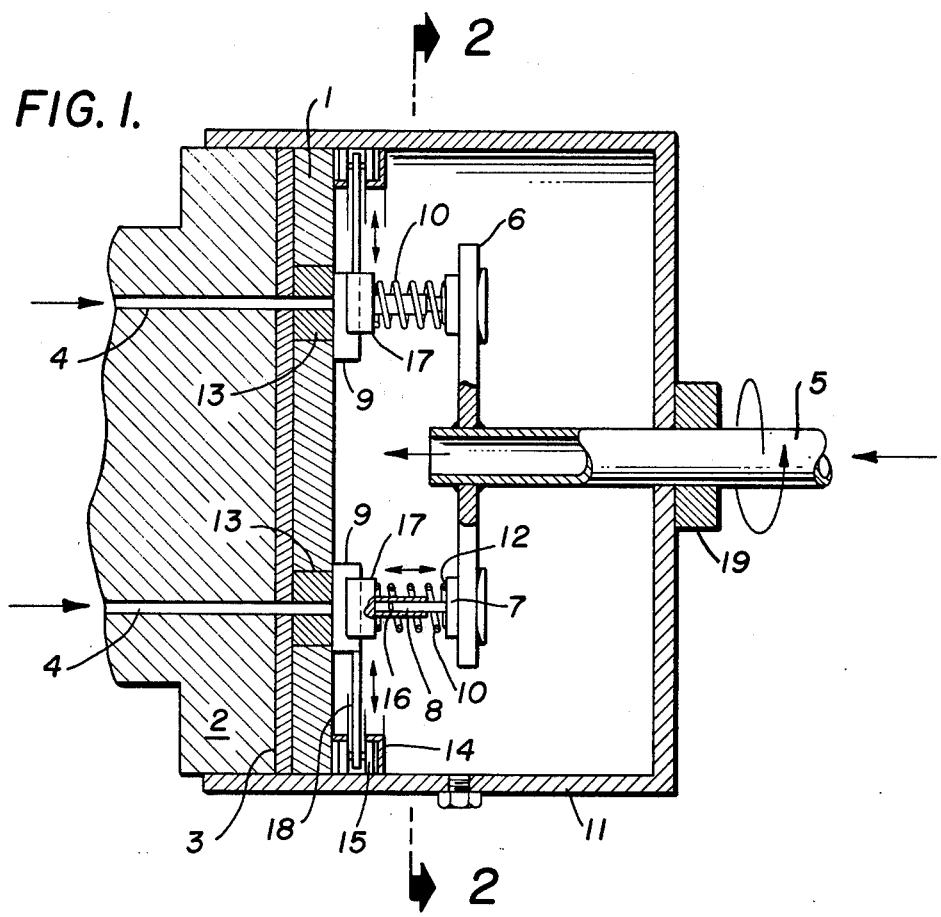
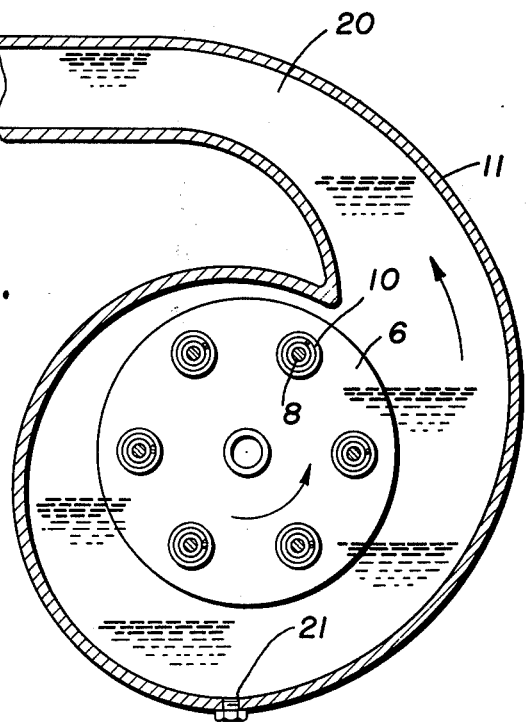

STRAND GRANULATION MACHINE

BACKGROUND OF THE INVENTION

Commercial man-made polymeric textiles fibers and filaments may be manufactured continuously from the raw materials to the finished fiber product, but because of the difficulty of synchronizing polymerization and fiber spinning and processing, the fact that many fibers producers do not have the polymerization capability or that in-house polymerization capability is physically remote from fiber spinning and processing facilities, it is quite common to prepare an intermediate polymeric granule or flake in which form the polymer can be easily handled, sold, stored, shipped, and then melted for further processing.

The granulaion of hard brittle material, particularly polylmeric material such as polyester polymer, is accomplished commercially only with the finest and hardest of cutters under ideal conditions, preferably utilizing the cooling effect of an underwater operation. Underwater flake cutting, according to methods and apparatus described in such patents as U.S. pat. Nos. 2,850,764; 3,277,519 and 3,600,745, is well known in the art. Strands are passed through passages and bushings, and upon emerging therefrom, are severed by rotating cutters. Flake cutting machines according to these methods and apparatus, when placed in continuous use, require frequent shutting down and resharpening or replacement of cutters. Production time is lost, and replacement cutters are expensive. Wear and tear on cutters, being of a high order, any method or apparatus by which blade life can be substantially increased or blade wear can be substantially reduced, would be a meritorious advance in the art. Moreover there is a well recognized and long felt need for increased cutter life in these machines.

SUMMARY OF THE INVENTION

In accordance with the present invention, the disadvantages of the prior art processes and apparatus are avoided and cutter life is substantially improved in rotor type continuous strand granulating machines where a plurality of strand passages are employed, and rotor borne cutters pass shear bushings generally aligned with the exit ends of the strand passages and engage and sever the emerging strands by method of and apparatus for varying the positions of the cutters with respect to the strands thereby to increase cutter life by moving the cutters reciprocally generally along the radius of the circle generated by their sweep of rotation, this being accomplished by employing a spring-loaded rotating cutter in working relation with a cutter positioning cam.

It is an advantage of this invention that such increased cutter blade life can be achieved without materially increasing the vibration or noise level, both of which are highly critical problems in the granulation of polymeric strands.

BRIEF DESCRIPTION OF THE DRAWING

FIG. 1 is an elevation section of a granulation device improved according to this invention; and, FIG. 2 is another elevation section taken along line A-A' of FIG. 1.

DESCRIPTION OF THE PREFERRED EMBODIMENTS

FIGS. 1 and 2 depict an apparatus of the type disclosed in U.S. Pat. No. 2,850,764, (hereby incorporated by reference) improved in accordance with this invention. Referring in detail to FIGS. 1 and 2, wear plate 1 is screwed to the face of and extrusion die 2 through and asbestos gasket 3, which insulates the die from the wear plate. Wear plate 1, containing insert shear bushings 13, projects through one wall of a volute casing 11 which contains cooling liquid. Channel 4 is one of a ring of rod-forming extrusion channels which pass from the die through asbestos gasket 3, the wall of the casing and wear plate 1. Shaft 5 is a hollow rotatable shaft through which cooling liquid is supplied. Circular plate 6 is fixed near the end of shaft 5 which passes therethrough; so that water introduced through shaft 5 will impinge against wear plate 1. Circular plate 6 is bored to receive a plurality of equally spaced projecting members 7, each of which comprises a piston 8 and shoulders 12. Cylinder 16 is affixed to cutter yoke 17 and slideably receives piston 8. Cutter 9 slides radially within cutter yoke 17. Shaft 5 can be moved towards and away from wear plate 1 and by this means the cutters may be brought into operation against the plate, or out of operation away from the plate. In operation, the cutters are firmly pressed against the plate by coil springs 10 acting between cutter 9 and shoulder 12 of projecting member 7. Cutters 9 are positioned variably with respect to shear bushing 13 by means of cam action. Cam track 14 is off-center with respect to wear plate 1. Cam roller 15 rotates within cam track 14 changing the position of cutter 9 through cam arm 18. Shear bushing 13 is one of a plurality of shear bushings inset in wear plate 1. The assembly is enclosed in volute casing 11, the front end of which casing is formed from a sheet of transparent plastic material through which the rotatable cutter passes at gland 19. The casing is provided with an outlet 20 for the cooling liquid and entrained granules of thermoplastic material and with a plugged drainage outlet 21.

In operation, the thermoplastic material is extruded through the circular extrusion channels 4 and shear bushings 13. Shaft 5 has been previously set so that cutters 9 are in their cutting position, and they are set in rotation, in a counterclockwise direction, preferably at a speed of not less than 100 revolutions per minute. Cooling liquid, preferably water, is supplied through the center of shaft 5. The centrifugal pumping action of the rotating cutter and the pressure of liquid entering through the shaft cause the liquid containing the cut granules of thermoplastic material to be carried up the outlet 20 of the casing from which it flows out to a suitable screen upon which the granules may be collected.

We claim:
1. Apparatus for granulating a strand, comprising
   a. an extrusion die having a plurality of extrusion channels arranged in a ring,
   b. a wear plate secured to the die and having mounted therein a plurality of shear bushings having openings for passage of the strands formed by the extrusion channels,
   c. a plate spaced from the wear plate and mounted for rotation about an axis concentric with the ring of extrusion channels, d. a plurality of spring-loaded cutter yokes mounted on the plate,
e. a plurality of cutters mounted on the cutter yokes for sliding movement in directions radial to said axis,
f. a cam track mounted off center with respect to said axis,
g. a plurality of cam rollers positioned to roll along said cam track, and
h. a plurality of cam arms each connecting one of the cam rollers to one of the cutters in such a manner that each cutter reciprocates radially as the plate is rotated.

* * * * *